Figure 8:
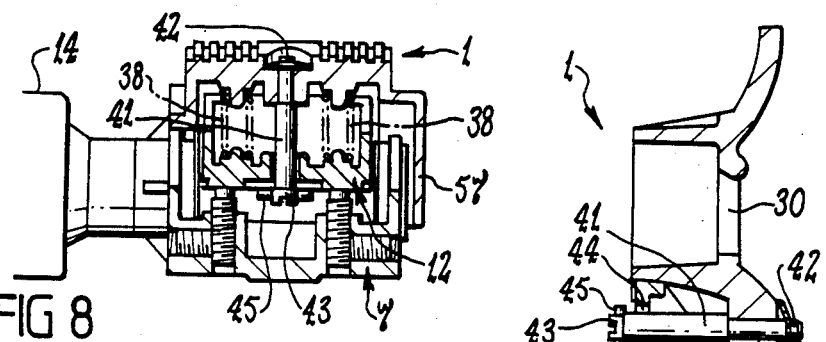

United States Patent [19]

Wood

[11] Patent Number: 4,730,391
[45] Date of Patent: Mar. 15, 1988

[54] WIRE STRIPPER

[75] Inventor: Harold L. Wood, St. Albans, Australia

[73] Assignee: Warren & Brown & Staff Pty. Ltd., Australia

[21] Appl. No.: 943,778

[22] Filed: Dec. 19, 1986

[30] Foreign Application Priority Data

Dec. 23, 1985 [AU] Australia ............................. PH3993

[51] Int. Cl.[4] ............................................. H02G 1/12
[52] U.S. Cl. ........................................ 30/90.1; 81/9.4
[58] Field of Search ....................... 81/9.51, 9.4, 9.44; 30/90.1, 91.2, 92, 93, 101, 102

[56] References Cited

U.S. PATENT DOCUMENTS

| | | |
|---|---|---|
| 2,120,398 | 6/1938 | Edwards et al. |
| 2,695,537 | 11/1954 | Imman et al. |
| 3,161,088 | 12/1964 | Tolman |
| 3,254,407 | 6/1966 | Apa et al. |
| 3,407,497 | 10/1968 | Ratay ................................. 30/91.2 |
| 4,616,533 | 10/1986 | Wiener et al. ......................... 81/9.44 |

FOREIGN PATENT DOCUMENTS

| | | | |
|---|---|---|---|
| 1344490 | 10/1963 | France | |
| 2133637 | 7/1984 | United Kingdom | ................... 81/9.4 |

OTHER PUBLICATIONS

Swedish Patent Office Search Report No. P AU 1653/86.

*Primary Examiner*—Roscoe V. Parker
*Attorney, Agent, or Firm*—Stevens, Davis, Miller & Mosher

[57] ABSTRACT

A wire stripper having a two-part hollow body and a group of circular cutters mounted within that body. The two body parts are interconnected for relative movement between an open position and a closed position at which the cutters are engageable with and penetrate into a cable end portion positioned within the body. Locating structure functions to properly position that cable end portion within the body. The cutters are spring biased so as to be movable into and out of a position at which they have maximum penetration in the cable end portion. A cable end stop fixes the axial position of the cable end portion and is movable into an inoperative position in response to the body parts being moved into the closed position. A handle is rotatably connected to the body and includes a releasable retainer which is engageable with the cable to hold the cable against movement relative to the handle. Each cutter is operative to form a respective circumferential cut around the cable end portion as a consequence of relative rotation between the body and the handle while the body parts are in the closed position. Stripping of the end portion is effected by removing the cable from the body while the body parts are in the closed position.

29 Claims, 11 Drawing Figures

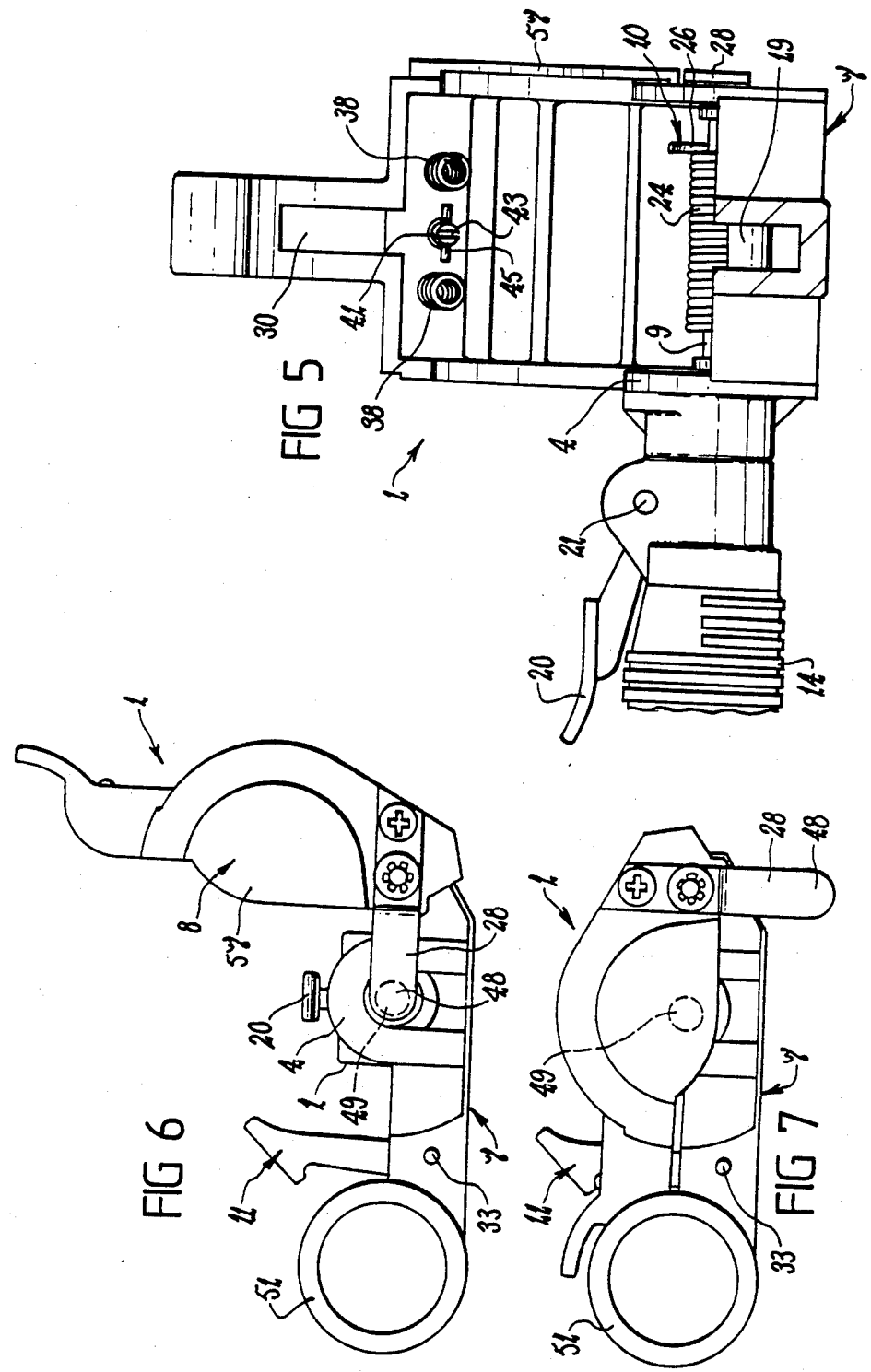

WIRE STRIPPER

This invention relates to wire strippers and is particularly although not exclusively concerned with stripping coaxial cable. It will be convenient to hereinafter describe the invention with particular reference to coaxial cable, but it is to be understood that the invention has wider application.

Coaxial cable strippers of the kind available prior to the present invention are inconvenient to use and consequently have not been satisfactory. In particular, such prior stripping devices have required separate operation or adjustment for each of the several cuts necessary to prepare the cable for stripping.

It is an object of the present invention to provide an improved cable stripper which is convenient to operate and is of relatively simple and compact construction. It is another object of the invention to provide such a stripper which is able to cut through cable insulation at a plurality of positions in a single operation.

According to the present invention, there is provided a wire stripper including, a body having two parts which are interconnected for relative movement between a closed position and an open position, locating means for receiving a cable end portion and locating that end portion at a particular position on said body, and a plurality of circular cutters mounted on said body for rotation relative thereto and being spaced apart in the direction of the longitudinal axis of a said cable end portion located at said particular position, each said cutter being arranged to engage and penetrate a respective distance into a said cable end portion at said particular position as a consequence of said body parts moving into said closed position and being operable to form a respective circumferential cut around that end portion in response to relative rotation of said body and said cable end portion about said longitudinal axis while the body parts are in the closed position.

It is preferred that the cutters are spring loaded, and it is further preferred that they are mounted in a replaceable cassette or the like. A stripping device having those features can be constructed in a variety of ways but it will be convenient to hereinafter describe one particular construction which has been found satisfactory in operation.

An embodiment of the invention is described in detail in the following passages of the specification which refer to the accompanying drawings. The drawings, however, are merely illustrative of how the invention might be put into effect, so that the specific form and arrangement of the various features as shown is not to be understood as limiting on the invention.

Figure 3:
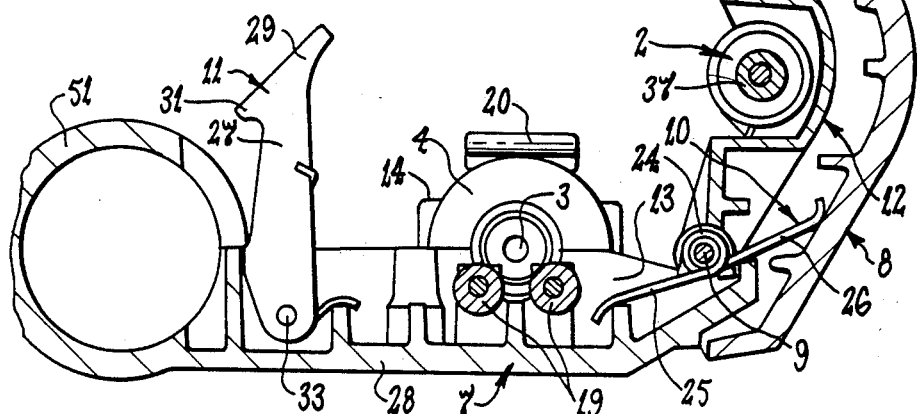
Figure 4:
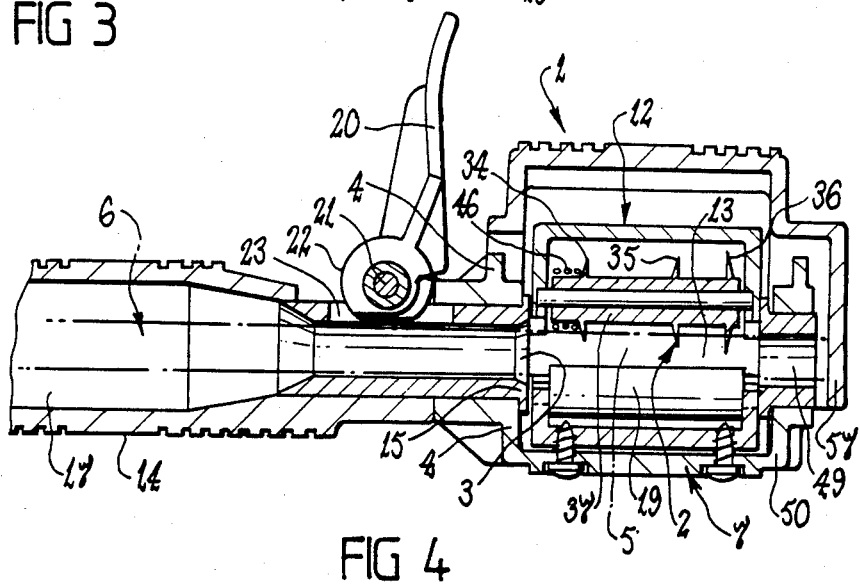

In the drawings:

FIG. 1 is a plan view of a wire stripper according to one embodiment of the invention, FIG. 2 is a cross-sectional view taken along line II—II of FIG. 1, FIG. 3 is a view similar to FIG. 2 but showing the device in an open condition, FIG. 4 is a cross-sectional view taken along line IV—IV of FIG. 1, FIG. 5 is a view similar to FIG. 4 but showing the device in an open condition and a cable end portion located within the device (the cutter cassette has been omitted from this view), FIG. 6 is an end view of the device shown in FIG. 5 and looking from the right-hand side of FIG. 5, FIG. 7 is a view similar to FIG. 6 but showing the device in a closed condition, FIG. 8 is a cross-sectional view taken along line VIII—VIII of FIG. 1, FIG. 9 is a cross-sectional view of a cassette as used in the device of FIG. 1, FIG. 10 is a semi-diagrammatic perspective view of the cutter assembly of the cassette shown in FIG. 8, FIG. 11 is a semi-diagrammatic view of a cable end portion after stripping by the device of FIG. 1.

The stripper device shown in the accompanying drawings includes a hollow body 1 which contains a plurality of disc-like cutters 2 (FIGS. 2 and 4) which are mounted for rotation about a common axis. An opening 3 (FIG. 3) is provided through one side wall 4 of the body 1 and forms part of cable locating means whereby the end portion 5 of a cable 6 (FIG. 5) can be introduced into the body 1 so as to be substantially parallel with the rotational axis of the cutters 2. The device is operable to reduce the lateral spacing between the cutter axis and the axis of the cable end portion 5 so as to cause the cutters 2 to engage and penetrate into the cable 6. Relative rotation of the cable 6 and the stripper device body 1 then results in each cutter 2 tracking around the longitudinal axis of the cable end portion 5 so as to create a respective cut around the circumference of that end portion.

According to the particular arrangement shown, the device body 1 is formed of two relatively movable parts, a main part 7 and a cover part 8. Relative movement between those body parts 7 and 8 enables the device to be moved between an open condition (FIGS. 3 and 5) at which a cable end portion 5 can be located within the body 1 and a closed condition (FIGS. 2 and 4) at which the cutters 2 engage and penetrate into the cable end portion 5. It is preferred that the two parts 7 and 8 are hinged together for relative movement about a pivot 9 as shown and a biasing spring 10 may be provided to urge the body parts 7 and 8 into the open or separated condition. Latch means 11 as hereinafter described may be provided to releasably retain the part 7 and 8 in the closed condition.

The cutters 2 are preferably mounted within the cover part 8 of the body 1 although they could be mounted within the main part 7 if desired. It is also preferred, as shown, that the cutters form part of a replaceable cassette 12 and there may be a plurality of such cassettes having different cutter arrangements to suit different circumstances. That is, each cassette 12 may have a particular number of cutters 2 as required for a particular use situation and which are laterally spaced and/or of preselected diameters to suit the particular use situation.

In the embodiment shown, the body main part 7 is hollow and defines a cavity 13 which is open at a top side of that main part 7. The cable access opening 3 is provided through one perimeter wall 4 of the main part 7 so that an end portion 5 of the cable 6 can be inserted into the cavity 13. That access opening 3 is formed at one end of a cable locating tube 14 which is connected to the perimeter wall 4 and extends laterally outwards therefrom. The connection between the perimeter wall 4 and the inner end portion 15 of the locating tube 14 is such that the tube 14 can be rotated about its longitudinal axis relative to the body main part 7, but is nevertheless held against separation from that main part 7. Also, as shown, the axis of the tube 14 is substantially coincident with the axis of the opening 3.

The locating tube 14 is arranged so that a cable end portion 5 can be inserted into the outer end 16 of the open ended passage 17 formed through the tube 14 and thereby guided to adopt a correct location within the cavity 13 of the body main part 7. An end stop 18 is provided at the side of the main part 7 opposite the cable access opening 3 so as to be engaged by the terminal end of the cable 6 and thereby fix the axial position of the cable 6 relative to the stripper device. The body main part 7 also includes support means which engages and supports the cable end portion 5 against deflection away from the cutters 2 during the cutting operation. In the construction shown, that support means includes a pair of laterally spaced rollers 19 which extend in the axial direction of the cable end portion 5 and have their rotational axes on respective opposite sides of the axis of the cable end portion 5.

It is also preferred to provide retainer means for releasably securing the cable 6 against withdrawal from and movable relative to the tube 14. In the form shown, that retainer means includes a toggle lever 20 which is mounted on the inner end portion of the locating tube 14 for relative movement about a pivot 21 having its axis extending transverse to the axis of the tube 14. A cam 22 is connected to that lever 20 and projects through an aperture 23 in the tube wall for engagement with the outer surface of the cable 6. The arrangement is such that in one pivotable position of the lever 20 as shown in FIG. 5, the cam 22 engages the cable 6 and firmly clamps the cable 6 against separation from the stripper device and in another pivotable position of the lever 20 as shown in FIG. 4, the cam 22 is clear of the cable 6 so that the cable 6 is free to move through the tube 14.

The cover part 8 of the body 1 is preferably pivotably connected to the main part 7 at a location adjacent one side of the body 1. It is usually convenient to have the axis of the pivot 9 parallel to the longitudinal axis of a cable end portion 5 located within the body 1, but that is not essential. The cover part 8 is arranged for pivotable movement into and out of a closed position (FIG. 2) at which it overlies the open top of the body main part 7 and thereby substantially closes the device body 1. The biasing spring 10 for urging the two parts 7 and 8 into their open condition (FIG. 3) may comprise a coil 24 located around a pin forming the pivot 9 and connecting the two parts 7 and 8, and two arms 25 and 26 which extend laterally from respective opposite ends of that coil 24 and engage a respective one of the body parts 7 and 8.

Latch means 11 for holding the two body parts 7 and 8 in the closed position includes a detent lever 27 which is pivotably connected to the body main part 7 so as to extend laterally outwards from the base 28 of that part 7. A head portion 29 of the lever 27 is arranged to pass through an opening 30 in the cover part 8 when the device is in the closed condition and has an abutment 31 which engages a surface of the cover part 8 so as to prevent opening movement of that part 8. A spring 32 or other resilient means may act on the lever 27 as shown to urge it about the pivot 33 so as to move in a latching direction towards a position at which the aforementioned engagement can occur. The lever head portion 29 is accessible externally of the cover part 8 so that it can be manually moved in the reverse direction and thereby free the cover part 8 for opening movement. Other forms of latching means can be adopted if desired.

The cassette 12 is located in the cover part 8 and contains the disc-like cutters 2. In the particular construction shown, there are three cutter discs 34, 35 and 36 in the group of cutters 2 carried by the cassette 12 and they are formed integral with a cylindrical shaft or sleeve 37. The cutter discs 34, 35 and 36 are laterally spaced apart in the axial direction of that sleeve 37 and each has a different diameter. The sleeve 37 is rotatably mounted on the cassette 12 so that in the mounted condition of the cassette 12, the cutters 2 are exposed for engagement with a cable. Also, the rotational axis of the sleeve 37 is parallel to that of the rollers 19 and in the closed condition of the body 1 the respective axes of the sleeve 37 and locating tube 14 lie in a plane which passes between the two rollers 19.

In the mounted condition of the cassette 12, the smaller cutter disc 34 will usually be located adjacent the locating tube 14 and the larger disc 36 will be located remote from that tube 14. Any suitable means may be employed to releasably hold the cassette 12 in assembly with the cover part 8. In the construction shown, however, the connection between the cassette 12 and the cover part 8 is such as to permit some degree of relative movement so that the cassette 12 can move into and out of a rest position at which the cutters 2 are arranged for maximum penetration into the cable 6. It is also preferred that springs 38 (FIG. 5) or other resilient means act between the cover part 8 and the cassette 12 so that the cassette 12 is normally held at the rest position.

As previously stated, it is preferred that the cutter cassette 12 is removably mounted in the body 1 so as to permit replacement by different cutter arrangements. In the construction shown, an end 39 of the cassette 12 is provided with a slot 40 (FIG. 9) which slidably receives the pivot pin 9 which is attached to the body 1. Any suitable means may be employed to releasably hold the cassette 12 against separation from the pivot pin 9, but in the construction shown that includes a retainer pin 41 which is connected to the cover part 8 at one end 42 and has its other end 43 projecting through an opening 44 in the cassette 12. A cross bar 45 extends laterally from the pin end 43 and the opening 44 is arranged so that the bar 45 cannot pass through that opening 44 unless the pin 41 has a particular rotational position relative to the cassette 12. When the pin 41 is in that rotational position, the cassette 12 can be swung downwards beyond the normal rest position so as to be clear of the pin 41 and it can then be slid off the pivot pin 9.

The cross bar 45 fixes the rest position of the cassette 12 because of its engagement with an undersurface of the cassette 12. If desired, the pin 41 may be threadably connected to the cover part 8 so as to enable adjustment of the relative axial position of the bar 45 and thereby vary the cassette rest position. Other means may be adopted for that purpose.

It is also preferred that the cutters 2 are restrained against rotation relative to the cover part 8 in one direction. In the construction shown, that is achieved by clutch means which automatically operates to resist if not prevent rotation of the cutters 2 in the aforementioned direction. Such an arrangement has the advantage of providing a different cutting action for different materials as might be encountered in a cable 6. According to the construction shown diagrammatically in FIG. 10, the clutch means includes a coil spring 46 which is neatly located about the cutter sleeve 37 and is anchored to the cassette body 1 by an arm 47 extending laterally from one end of the coil 46. There is a degree of frictional engagement between the coil 46 and the sleeve 37.

The foregoing arrangement is such that the clutch means is responsive to the direction of turning torque which is applied to the cutter sleeve 37. That is, when the cutters 2 are influenced to rotate in one direction, the coil 46 imposes minimum resistance to that rotation. When the cutters 2 are influenced to rotate in the opposite direction, however, the resulting reaction between the sleeve 37 and coil 46 induces the coil 46 to close more tightly about the sleeve 37 and thereby clamp the sleeve 37 so that it is held against rotation. That clamping engagement is automatically released when the turning influence is removed from the cutters 2 or when the cutters 2 are influenced to rotate in the first mentioned direction. It will be apparent that other forms of clutches may be satisfactory for the purpose stated.

The cable end stop 18 is preferably in the form of a lever as shown in FIGS. 6 and 7 which is connected to the cover part 8 so as to move with that cover part 8. In the open condition of the body 1, an end portion 48 of the lever 18 overlies an opening 49 formed through the side wall 50 of the body part 7 which is opposite to the wall 4. The cable end portion 5 is receivable in the opening 49 so as to be engageable with the lever end portion 48 and thereby fix the axial position of the cable 6. When the body 1 is closed, however, the lever 18 is swung out of the way so as to be clear of the opening 49 and is thereby unable to resist outward axial movement of the cable 6. That has the advantage of allowing the cable 6 to expand axially during the cutting operation and thereby avoids end loading which could break the cable 6 or otherwise disturb the neatness of the stripping operation.

It is preferred, as shown, that a second stop is arranged to adopt an operative position at which it is located over the opening 49 when the body parts 7 and 8 are closed. That second stop may be a plate 57 secured to or formed integral with the cover part 8 and arranged to overlie the opening 49 in the closed position, but not the open position, of the body 1. The plate 57 is thereby arranged in axial alignment with the cable 6 when the body parts 7 and 8 are in the closed position, but has its innermost surface located further outwards from the wall 50 than the innermost surface of the lever end portion 48. That is, the clearance between the stop plate 57 and the wall 50 is greater than that between the stop lever 18 and the wall 50. The plate 57 is therefore arranged so as not to substantially impede the aforementioned axial expansion of the cable 6, but it may nevertheless be engaged by the terminal end of the cable 6 in the course of the cutting operation.

The device body 1 is opened and the lever 20 is in the FIG. 4 position when it is desired to locate a cable end portion 5 within the body 1. That end portion 5 is inserted through the locating tube 14 until its terminal end engages the stop 18, which is located as shown in FIG. 6, and the lever 20 is then swung to the FIG. 5 position to clamp the cable 6. The cover part 8 is then swung towards the main part 7 of the body 1 and during that movement the stop 18 is automatically moved towards the position shown in FIG. 7. Also, at least the largest cutter disc 36 engages against the outer surface of the cable end portion 5. Continued closing movement results in some penetration of that cutter disc 36 into the cable 6, and perhaps the other cutter discs 34 and 35 as well, but there will also be some depression of the cutter cassette 12 into the cover part 8 because of the resilient mounting of the cassette 12. In the fully closed condition of the body 1, the latch 11 automatically operates to hold it closed. The user then rotates the body 1 relative to the cable 6 by holding the tube 14, which serves as a handle, and the body 1 in separate hands. A finger engageable ring 51 may be provided on one of the body parts 7 and 8 to add to the convenience of that operation. That is, the user may hold the locating tube 14 in one hand and engage the ring 51 with the other.

As the body 1 is rotated relative to the tube 14, and consequently the cable 6, each cutter disc 34, 35 and 36 tracks around the circumference of the cable end portion 5 and cuts into the cable insulation. The depth of each such cut may increase with repeated relative rotation of the body 1 because of the progressively decreasing resistance to movement of the cassette 12 towards its rest position or position of minimum depression. The cutters 2 are preselected so that at the position of minimum depression of the cassette 12 each cutter disc 34, 35 and 36 will have cut into the cable 6 to the required depth. In an example situation the smaller cutter disc 34 will have cut through the outer insulation 52 (FIG. 1) of the cable 6, the intermediate cutter disc 35 will have penetrated through the metal sheath 53 between the two insulation layers 52 and 54 and the larger cutter disc 36 will have penetrated through to the core 55 of the cable 6 (e.g., metal wire).

The lever 20 is then released so that the length of cable 6 can be withdrawn out of the locating tube 14. That action automatically causes stripping of the cable end portion 5 beyond each of the three cuts because the cutters 2 are still embedded into the cable 6 and therefore act as stripping elements. When the cable 6 is fully withdrawn, there will be an exposed length of core 55 at the very end, and exposed length of the inner insulation 54 spaced from the terminal end 56, and an exposed section of the metal sheath 53 spaced even further from the terminal end 56, as shown in FIG. 11. Different arrangements will of course result from use of different cutter assemblies.

If desired, the cable end stop plate 57 may carry a plunger (not shown) which is accessible from the exterior of the body 1 and which can be depressed to free offcuts perhaps jammed within the device adjacent the stop plate 57. Opening of the body 1 enables the offcuts to be discharged so that the device is ready for further operation.

A device as described is of relatively simple construction and is extremely convenient to operate. It is particularly advantageous that the device can perform a series of cuts in a single operation without the need for separate adjustment for each cut as is the case with some prior devices of the same kind.

Various alterations, modifications and/or additions may be introduced into the constructions and arrangements of parts previously described without departing from the spirit or ambit of the invention as defined by the appended claims.

Having now described my invention, what I claim as new and desire to secure by Letters Patent is:

1. A wire stripper including, a body having two parts which are interconnected for relative movement between a closed position and an open position, locating means for receiving a cable end portion and locating that end portion at a particular position on said body, and a plurality of circular cutters mounted on said body for rotation relative thereto and being spaced apart in the direction of the longitudinal axis of a said cable end portion located at said particular position, each said cutter being arranged to engage and penetrate a respective distance into a said cable end portion at said particular position as a consequence of said body parts moving into said closed position and being operable to form a respective circumferential cut around that end portion in response to relative rotation of said body and said cable end portion about said longitudinal axis while the body parts are in the closed position.

2. A wire stripper according to claim 1, wherein at least two said cutters are mounted for rotation about a common axis.

3. A wire stripper according to claim 1, wherein said cutters are each of a different diameter.

4. A wire stripper according to claim 1, wherein each said cutter is mounted on said body for movement into and out of a rest position at which the said cutter is arranged for maximum penetration into a said cable end portion, and biasing means urges each said cutter into said rest position.

5. A wire stripper according to claim 1, wherein end stop means is arranged to be engaged by a terminal end of a said cable end portion located at said particular position so as to fix the axial location of that end portion.

6. A wire stripper according to claim 5, wherein said end stop means is movable into and out of an operative position at which it is engageable by a said terminal end, and moves out of said operative position in response to said body parts being moved towards said closed position.

7. A wire stripper according to claim 6, wherein second end stop means is arranged in axial alignment with said terminal end when said body parts are in the closed position, said second stop means is spaced outwards in the direction of said longitudinal axis from the position adopted by the first said stop means when the body parts are in the open position, and said second stop means is responsive to movement of said body parts towards said open position so as to move out of said axial alignment.

8. A wire stripper according to claim 1, wherein two movable end stop means are provided on said body, one said end stop means is arranged to move into and out of an operative position in response to movement of said body parts respectively into and out of said open position, the other said end stop means is arranged to move into and out of an operative position in response to movement of said body parts respectively into and out of said closed position, each said end stop means overlies the terminal end of a said cable end portion when in its respective operative position, and the operative position of one said end stop means is spaced from that of the other said end stop means in the direction of said longitudinal axis.

9. A wire stripper according to claim 1, wherein said cutters are removable from said body for interchangeability with another plurality of cutters.

10. A wire stripper according to claim 9, wherein said cutters are arranged in a single group and form part of a cassette which is releasably connected to one said body part.

11. A wire stripper according to claim 10, wherein said cassette is mounted on said one body part for relative movement into and out of a rest position at which said cutters are arranged for respective maximum penetration into a said cable end portion, and biasing means acts between said cassette and said one body part to urge said cassette into said rest position.

12. A wire stripper according to claim 11, wherein said cassette is mounted on said body part for relative movement about a pivot axis, and releasable retainer means is operable to enable said cassette to be removed from said pivotal mounting.

13. A wire stripper according to claim 12, wherein said retainer means also functions to establish said rest position.

14. A wire stripper according to claim 11, wherein adjusting means is provided for adjusting the location of said rest position relative to said one body part.

15. A wire stripper according to claim 13, wherein said retainer means is adjustable to vary the location of said rest position relative to said one body part.

16. A wire stripper according to claim 1, wherein means is operable to at least resist rotation of each said cutter in one direction relative to said body.

17. A wire stripper according to claim 16, wherein said cutters are interconnected so as to be incapable of relative rotation, and said rotation resisting means is in the form of clutch means which is responsive to turning torque applied to said cutters so as to either resist or allow said cutter rotation according to the direction of that torque.

18. A wire stripper according to claim 17, wherein said cutters are each fixed to a shaft for rotation with that shaft, and said clutch means includes a coil spring which is located about said shaft in close fitting relationship and an arm extending from one end of that spring and engaging said body.

19. A wire stripper according to claim 1, wherein said cutters are mounted on one said body part, said locating means is provided on the other said body part, and said locating means includes an opening through a wall of said other body part which is adapted to slidably receive a said cable end portion and support means located within said other body part which is adapted to support said end portion against movement away from said cutters when the body parts are moved into said closed position.

20. A wire stripper according to claim 19, wherein said support means includes a pair of rollers which are rotatably mounted within said other body part in laterally spaced relationship and have their respective axes extending substantially in the direction of said longitudinal axis.

21. A wire stripper according to claim 19, wherein a further opening is provided through a wall of said other body part opposite to the first said wall thereof, and end stop means is located externally of that opposite wall for engagement by the terminal end of a cable end portion located at said particular position.

22. A wire stripper according to claim 21, wherein said end stop means is movable into and out of an operative position at which it is engageable by a said terminal end.

23. A wire stripper according to claim 19, wherein a handle is connected to said other body part and is rotatable relative to said other body part about an axis which is substantially parallel with said longitudinal axis.

24. A wire stripper according to claim 23, wherein said handle is connected to and extends laterally outwards from said wall.

25. A wire stripper according to claim 23, wherein an open ended passage extends through said handle and has its axis substantially coincident with said longitudinal axis, and releasable retainer means is provided on said handle and is operative to engage a cable extending through said passage so as to hold that cable against movement relative to said handle.

26. A wire stripper according to claim 25, wherein said retainer means includes a lever which is pivotally mounted on said handle and a cam connected to that lever for movement therewith and which is engageable with said cable.

27. A wire stripper according to claim 1, wherein said body parts are pivotally connected for said relative movement.

28. A wire stripper according to claim 1, wherein latch means is operative to releasably hold said body parts in said closed position.

29. A wire stripper according to claim 1, wherein spring means urges said body parts towards said open position.

* * * * *